(12) United States Patent
Pickard (10) Patent No.: US 9,157,602 B2
(45) Date of Patent: Oct. 13, 2015

(54) OPTICAL ELEMENT FOR A LIGHT SOURCE AND LIGHTING SYSTEM USING SAME

(75) Inventor: Paul Kenneth Pickard, Morrisville, NC (US)

(73) Assignee: Cree, Inc., Durham, NC (US)

( * ) Notice: Subject to any disclaimer, the term of this patent is extended or adjusted under 35 U.S.C. 154(b) by 282 days.

(21) Appl. No.: 12/776,799

(22) Filed: May 10, 2010

(65) Prior Publication Data
US 2011/0273882 A1    Nov. 10, 2011

(51) Int. Cl.
| F21V 5/00 | (2015.01) |
|---|---|
| F21V 5/04 | (2006.01) |
| F21V 3/00 | (2015.01) |
| F21K 99/00 | (2010.01) |
| F21V 7/00 | (2006.01) |
| G02B 19/00 | (2006.01) |
| F21Y 101/02 | (2006.01) |

(52) U.S. Cl.
CPC ... *F21V 5/04* (2013.01); *F21K 9/00* (2013.01); *F21K 9/13* (2013.01); *F21V 7/0091* (2013.01); *G02B 19/0028* (2013.01); *G02B 19/0061* (2013.01); *G02B 19/0066* (2013.01); *F21Y 2101/02* (2013.01)

(58) Field of Classification Search
CPC ....... G02B 19/0061; F21V 7/041; F21V 5/04; F21V 5/045; F21V 5/048
USPC .............. 362/237, 296.08, 311.01, 311.02, 3, 362/11.06, 326, 334, 335
See application file for complete search history.

(56) References Cited

U.S. PATENT DOCUMENTS

| 3,581,162 A | 5/1971 | Wheatley |
|---|---|---|
| 5,463,280 A | 10/1995 | Johnson |
| 5,561,346 A | 10/1996 | Byrne |

(Continued)

FOREIGN PATENT DOCUMENTS

| CN | 1404630 A | 3/2003 |
|---|---|---|
| CN | 1864026 A | 11/2006 |

(Continued)

OTHER PUBLICATIONS

Cree, Inc., International Application No. PCT/US2011/035690, International Search Report and Written Opinion, Aug. 2, 2011, 10 pages.

(Continued)

*Primary Examiner* — Robert May
*Assistant Examiner* — Bryon T Gyllstrom
(74) *Attorney, Agent, or Firm* — Steven B. Phillips; Moore & Van Allen PLLC (57) ABSTRACT

An optical element for a light source and a lighting system using the optical element are disclosed. In example embodiments, the optical element includes an entry surface and an exit surface opposite the entry surface. The entry surface includes at least three subsurfaces, wherein each subsurface is disposed to receive light rays leaving light source. Each of the three subsurfaces is geometrically shaped and positioned to receive light rays entering the optical element through that subsurface in order to direct the light passing through the optical element. In some embodiments the optical element includes a concentrator lens disposed in the exit surface. The optical element can also include a mixing treatment. A lighting system can include multiple optical elements, each paired with a light source such as an LED or LED package.

25 Claims, 9 Drawing Sheets

(56) References Cited

U.S. PATENT DOCUMENTS

| | | | |
|---|---|---|---|
| 5,585,783 A | 12/1996 | Hall | |
| 5,655,830 A | 8/1997 | Ruskouski | |
| 5,688,042 A | 11/1997 | Madadi et al. | |
| 5,806,965 A | 9/1998 | Deese | |
| 5,947,588 A | 9/1999 | Huang | |
| 5,949,347 A | 9/1999 | Wu | |
| 5,971,551 A | 10/1999 | Winston et al. | |
| 6,220,722 B1 | 4/2001 | Begemann | |
| 6,227,679 B1 | 5/2001 | Zhang et al. | |
| 6,234,648 B1 | 5/2001 | Borner et al. | |
| 6,250,774 B1 | 6/2001 | Begemann et al. | |
| 6,276,822 B1 | 8/2001 | Bedrosian et al. | |
| 6,465,961 B1 | 10/2002 | Cao | |
| 6,523,978 B1 | 2/2003 | Huang | |
| 6,543,911 B1 | 4/2003 | Ritkin et al. | |
| 6,547,423 B2 * | 4/2003 | Marshall et al. | 362/333 |
| 6,550,953 B1 | 4/2003 | Ichikawa et al. | |
| 6,634,770 B2 | 10/2003 | Cao | |
| 6,659,632 B2 | 12/2003 | Chen | |
| 6,709,132 B2 | 3/2004 | Ishibashi | |
| 6,724,543 B1 * | 4/2004 | Chinniah et al. | 359/718 |
| 6,803,607 B1 | 10/2004 | Chan et al. | |
| 6,814,470 B2 | 11/2004 | Ritkin et al. | |
| 6,848,819 B1 | 2/2005 | Arndt et al. | |
| 6,864,513 B2 | 3/2005 | Lin et al. | |
| 6,899,443 B2 | 5/2005 | Ritkin et al. | |
| 6,902,291 B2 | 6/2005 | Ritkin et al. | |
| 6,948,829 B2 | 9/2005 | Verdes et al. | |
| 6,951,418 B2 | 10/2005 | Ritkin et al. | |
| 6,982,518 B2 | 1/2006 | Chou et al. | |
| 6,988,815 B1 | 1/2006 | Ritkin et al. | |
| 7,048,412 B2 | 5/2006 | Martin et al. | |
| 7,080,924 B2 | 7/2006 | Tseng et al. | |
| 7,083,313 B2 * | 8/2006 | Smith | 362/555 |
| 7,086,756 B2 | 8/2006 | Maxik | |
| 7,086,767 B2 | 8/2006 | Sidwell et al. | |
| 7,144,135 B2 | 12/2006 | Martin et al. | |
| 7,165,866 B2 | 1/2007 | Li | |
| 7,168,839 B2 * | 1/2007 | Chinniah et al. | 362/555 |
| 7,172,314 B2 | 2/2007 | Currie et al. | |
| 7,207,700 B2 * | 4/2007 | Fallahi et al. | 362/334 |
| 7,275,849 B2 * | 10/2007 | Chinniah et al. | 362/555 |
| 7,354,174 B1 | 4/2008 | Yan | |
| 7,396,142 B2 | 7/2008 | Laizure, Jr. et al. | |
| 7,401,948 B2 * | 7/2008 | Chinniah et al. | 362/326 |
| 7,410,275 B2 * | 8/2008 | Sommers et al. | 362/335 |
| 7,438,444 B2 * | 10/2008 | Pao et al. | 362/327 |
| 7,465,075 B2 * | 12/2008 | Chinniah et al. | 362/336 |
| 7,474,474 B2 * | 1/2009 | Angelini et al. | 359/708 |
| 7,483,220 B2 * | 1/2009 | Kittelmann et al. | 359/742 |
| 7,503,669 B2 | 3/2009 | Ritkin et al. | |
| 7,513,656 B2 * | 4/2009 | Park et al. | 362/333 |
| 7,600,882 B1 | 10/2009 | Morejon et al. | |
| 7,726,836 B2 | 6/2010 | Chen | |
| 7,824,065 B2 | 11/2010 | Maxik | |
| 8,021,025 B2 | 9/2011 | Lee | |
| 8,253,316 B2 | 8/2012 | Sun et al. | |
| 8,272,762 B2 | 9/2012 | Maxik et al. | |
| 8,274,241 B2 | 9/2012 | Guest et al. | |
| 8,277,082 B2 | 10/2012 | Dassanayake et al. | |
| 8,282,250 B1 | 10/2012 | Dassanayake et al. | |
| 8,292,468 B2 | 10/2012 | Narendran et al. | |
| 8,322,896 B2 | 12/2012 | Falicoff et al. | |
| 8,371,722 B2 | 2/2013 | Carroll | |
| 8,400,051 B2 | 3/2013 | Hakata et al. | |
| 8,415,865 B2 | 4/2013 | Liang et al. | |
| 8,421,320 B2 | 4/2013 | Chuang | |
| 8,421,321 B2 | 4/2013 | Chuang | |
| 8,421,322 B2 | 4/2013 | Carroll et al. | |
| 8,449,154 B2 | 5/2013 | Uemoto et al. | |
| 8,502,468 B2 | 8/2013 | Li et al. | |
| 8,641,237 B2 | 2/2014 | Chuang | |
| 8,653,723 B2 | 2/2014 | Cao et al. | |
| 8,696,168 B2 | 4/2014 | Li et al. | |
| 8,740,415 B2 | 6/2014 | Wheelock | |
| 8,750,671 B1 | 6/2014 | Kelly et al. | |
| 8,752,984 B2 | 6/2014 | Lenk et al. | |
| 8,760,042 B2 | 6/2014 | Sakai et al. | |
| 2003/0076034 A1 | 4/2003 | Marshall et al. | |
| 2004/0201990 A1 | 10/2004 | Meyer | |
| 2005/0152153 A1 | 7/2005 | Amano | |
| 2006/0061990 A1 | 3/2006 | Chinniah et al. | |
| 2006/0061999 A1 * | 3/2006 | Sommers et al. | 362/335 |
| 2006/0098308 A1 | 5/2006 | Angelini | |
| 2008/0316752 A1 * | 12/2008 | Kostuch | 362/311 |
| 2009/0040768 A1 * | 2/2009 | Zhu et al. | 362/309 |
| 2009/0067180 A1 * | 3/2009 | Tahmosybayat | 362/339 |
| 2009/0086498 A1 * | 4/2009 | Condon et al. | 362/477 |
| 2009/0121238 A1 | 5/2009 | Peck | |
| 2009/0184618 A1 | 7/2009 | Hakata et al. | |
| 2009/0296407 A1 * | 12/2009 | Bailey | 362/309 |
| 2012/0040585 A1 | 2/2012 | Huang | |

FOREIGN PATENT DOCUMENTS

| | | |
|---|---|---|
| CN | 101101095 A | 1/2008 |
| EP | 1058221 A2 | 12/2000 |
| EP | 0890059 B1 | 6/2004 |
| GB | 2345954 A | 7/2000 |
| JP | 6379005 U | 5/1988 |
| JP | H09265807 A | 10/1997 |
| JP | 2000173304 A | 6/2000 |
| JP | 2001118403 A | 4/2001 |
| WO | 0124583 A1 | 4/2001 |
| WO | 0160119 A2 | 8/2001 |
| WO | 2010038025 A2 | 4/2010 |
| WO | 2012011279 A1 | 1/2012 |
| WO | 2012031533 A1 | 3/2012 |

OTHER PUBLICATIONS

Cree, Inc., Taiwanese Application No. 100116389, Office Action, Oct. 7, 2013.
Chinese Patent Office, Chinese Application No. 201180030207.8 dated Jul. 1, 2014, 19 pages.
Chinese Patent Office, Office Action for Application No. 201180030207.8 dated Mar. 25, 2015.

* cited by examiner

OPTICAL ELEMENT FOR A LIGHT SOURCE AND LIGHTING SYSTEM USING SAME

BACKGROUND

Light emitting diode (LED) lighting systems are becoming more prevalent as replacements for existing lighting systems. LEDs are an example of solid state lighting and have advantages over traditional lighting solutions such as incandescent and fluorescent lighting because they use less energy, are more durable, operate longer, can be combined in red-blue-green arrays that can be controlled to deliver virtually any color light, and contain no lead or mercury.

In many applications, one or more LED dies (or chips) are mounted within an LED package or on an LED module, which may make up part of a lighting fixture which includes one or more power supplies to power the LEDs. Some lighting fixtures include multiple LED modules. A module or strip of a fixture includes a packaging material with metal leads (to the LED dies from outside circuits), a protective housing for the LED dies, a heat sink, or a combination of leads, housing and heat sink.

An LED fixture may be made with a form factor that allows it to replace a standard threaded incandescent bulb, or any of various types of fluorescent lamps. LED fixtures and lamps often include some type of optical elements external to the LED modules themselves. Such optical elements may allow for localized mixing of colors, collimate light, and/or provide the minimum beam angle possible.

Optical elements may include reflectors, lenses, or a combination of the two. Reflectors can be, for example, of the metallic or mirrored type, in which light reflects of opaque silvered surfaces. Reflectors may also be made of glass or plastic and function through the principle of total internal reflection (TIR) in which light reflects inside the optical element because it strikes an edge of the element at and angle which is equal to or greater than the critical angle relative to the normal vector.

SUMMARY

Embodiments of the present invention provide an optical element that can enable a lighting system to achieve beam control, and where necessary, effective mixing of light from multiple sources, e.g. color mixing. An optical element according to example embodiments can be useful where highly controlled beams of light are needed, for example, in track lighting, display lighting, and entertainment lighting. An optical element according to example embodiments can also be useful to provide various lighting effects.

In example embodiments of the invention an optical element includes an entry surface and an exit surface spaced from the entry surface. The entry surface includes at least three subsurfaces, wherein each subsurface is disposed to receive light rays from the light source. Each of the three subsurfaces is geometrically shaped and positioned to direct light rays entering the optical element through that subsurface in order to direct light through the optical element. Thus, a first subsurface can direct a first portion of the light from the light source, a second subsurface can direct a second portion of light from the light source, and a third subsurface can direct a third portion of light from the light source. The optical element also includes an outer surface disposed between the exit surface and the entry surface. In some embodiments the outer surface is conic, including parabolic in shape.

In at least some embodiments, the subsurfaces include a spherical subsurface, a flat conic subsurface, and an inverted conic subsurface. In some embodiments, the subsurfaces include a flat subsurface, a spherical subsurface, and an inverted spherical subsurface. In some embodiments, the optical element includes a concentrator lens disposed in the exit surface. The concentrator lens can be, for example, a Fresnel lens or a spherical lens.

In some embodiments, the optical element includes a light mixing treatment. The light mixing treatment can be, for example, a diffractive surface treatment in the exit surface of the optical element. As additional examples, the light mixing treatment can also be a patterned lens treatment in the exit surface or faceting in the exit surface of the optical element. A light mixing treatment could also consist of or include faceting in the entry surface of the optical element or faceting in the outer surface of the optical element. The light mixing treatment could also be implemented by volumetric diffusion material spaced a small airgap away from the exit surface of the optical element. In some embodiments, the light mixing treatment provides mixing of different color light.

A lighting system according to example embodiments of the invention includes at least one light source and an optical element as described above disposed to collimate the light from the light source. In some embodiments, the light source is an LED or LED package. In some embodiments, the LED package contains multiple LED devices. In some embodiments, a plurality of light sources is arranged in an array and each light source is paired with an optical element. Such a lighting system can be assembled by arranging the light sources on a mounting surface, and placing the optical elements in front of the light sources. An optical element is placed at each light source to direct and collimate the light as appropriate. Such a lighting system can form a fixture that replaces a standard incandescent or fluorescent light bulb.

BRIEF DESCRIPTION OF THE DRAWINGS

FIG. 2 is shown in two views as FIG. 2A and FIG. 2B.

DETAILED DESCRIPTION

The following detailed description refers to the accompanying drawings, which illustrate specific embodiments of the invention. Other embodiments having different structures and operation do not depart from the scope of the present invention. Embodiments of the invention are described with reference to drawings included herewith. Like reference numbers refer to like structures throughout. It should be noted that the drawings are schematic in nature. Also, the drawings illustrate but a few specific embodiments of the invention.

Figure 1:
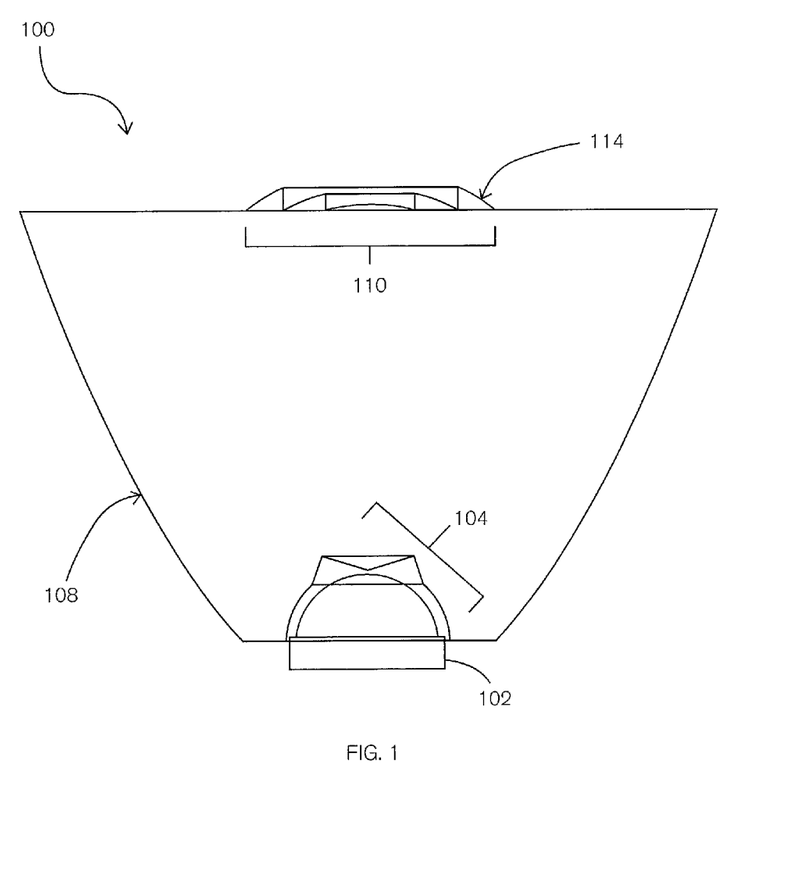
FIG. 1 shows a cross-sectional side view of an optical element according to some embodiments of the present invention. The optical element of FIG. 1 is pictured in conjunction with a light emitting diode (LED) light source.

FIG. 1 shows a side view cross-section of an optical element according to example embodiments of the invention. Optical element 100 is placed over a light source, in this case, LED package or module 102. LED module 102 contains one or more die, each an LED. In some cases, the LED module or package can simply be referred to as an LED even if contains more than one actual semiconductor device or more than one die. For instance, if the package is to emit white light, multiple actual LED devices of different colors might be included. As an example, red and blue-shifted yellow (R+BSY) devices might be used together in the same package.

Optical element, or more simply, "optic" 100 is clear, and in this example, is made of material having an index of refraction of approximately 1.5. The refractive indices of glasses and plastics vary, with some materials having an index of refraction as low as 1.48 and some others, for example some polycarbonates having an index of refraction of 1.59. Such materials include glass and/or acrylic, both of which are commonly used in optical components. Optic 100 includes entry surface 104, which completely covers the lens portion of LED 102. Light from the LED device enters the optic through entry surface 104. Light from the LED exits the optical element through exit surface 106, which is spaced from and positioned generally opposite entry surface 104. Exit surface 106 is round in shape, as will be apparent when it is observed from a different view in a finished lighting system in FIG. 5, which will be discussed later in this disclosure. In one example embodiment, the radius of the circle defining exit surface 106 is approximately 16 mm, and the height of the optical element not including the concentrator lens (discussed further below) is approximately 20 mm.

Still referring to FIG. 1, optical element 100 includes outer surface 108, which is disposed roughly between and to the side of entry surface 104 and exit surface 106 and conforms in shape substantially to a portion of a parabola (i.e. is parabolic). It should be noted that the parabolic surface provides for many light rays to be totally reflected internally and exit the optic through top surface (exit surface) 106 at or near a normal angle relative to the top surface. However, if the entire entry surface was spherical in shape, light rays would enter at the normal to the entry surface, and thus not be bent. Therefore, only light rays which struck parabolic outer surface 108 would be reflected through top surface 106 at a normal angle. Light rays that came from the light source straight up would also exit the optic at a normal angle relative to top surface 106. All other light rays would leave the optical element through the top surface 106 at an angle and be bent away from the normal vector relative to top surface 106, since these rays would be passing from a medium with a refractive index of roughly 1.5 into air, which has a refractive index of approximately 1. This bending away would actually decrease the collimation of the light through the optical element.

The parabolic shape of outer surface 108 is defined by the formula:

$$z = \frac{cr^2}{1 + \sqrt{1 - (1 - kc^2 r^2)}}$$

where x, y and z are positions on a typical 3-axis system, k is the conic constant, and c is the curvature. The formula specifies conic shapes generally. For a parabolic shape, k is less than or equal to −1. However, it should be noted that the outer surface being parabolic, and indeed being conic is just an example. Optical elements with three or more entry surfaces could be designed with outer surfaces of various shapes; for example, angled, arced, spherical, curved as well as spherical, including segmented shapes. A parabolic or partially parabolic surface as shown in the examples disclosed herein may be used to provide total internal reflection (TIR), however, there may be instances where total internal reflection is not be needed or desired at all points of the optic.

Continuing with FIG. 1, another feature of optical element 100 is concentrator lens 110 disposed in or on exit surface 106. In at least some embodiments, the concentrator lens can be molded into the optic, for example where acrylic is used and the entire optic is injection molded. As will be seen later when illustrative paths for light rays are shown and discussed, concentrator lens 110 causes light rays that would normally be bent slightly away from the normal near the center of exit surface 106 to be bent to be substantially parallel with or towards the normal, thus effectively collimating the light through optic 100 near its center. In this particular embodiment of the optical element, concentrator lens 110 is a circular Fresnel lens. A spherical concentrator lens can also be used. In the example of FIG. 1, the diameter of the Fresnel lens is approximately 11.2 mm and the radius of curvature of the outermost edge is approximately 9 mm.

Figure 2A:
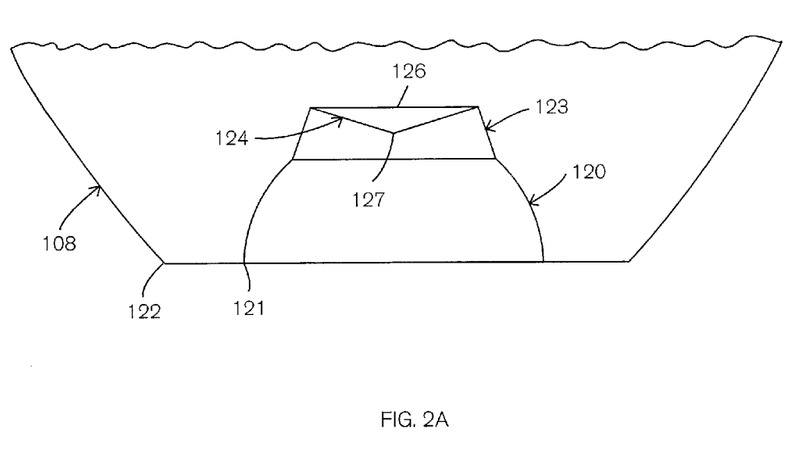
FIG. 2 shows magnified views of the light entry portion of the optical element of FIG. 1 with the LED omitted for clarity.
Figure 2B:
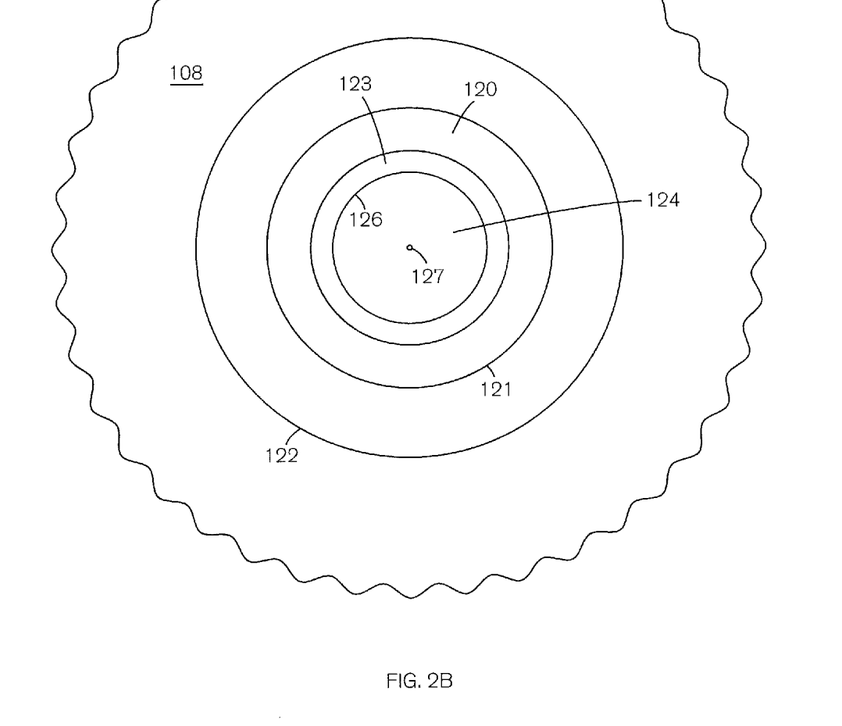

FIG. 2 is a magnified view of the entry surface portion of optical element 100. For clarity, the LED device 102 is omitted from FIG. 2, and indeed the rest of the Figures described herein. FIG. 2 is shown in two views, FIG. 2A and FIG. 2B. FIG. 2A is shown looking through the side of the optic. FIG. 2B is a view looking down at the bottom of the optical element from inside the optical element itself. A portion of parabolic outer surface 108 is visible in FIG. 2A. However, the main purpose of FIG. 2 is to clearly illustrate the entry surface of the optical element. In this example embodiment, the entry surface includes three distinct subsurfaces, wherein each subsurface is disposed to receive light from the light source in a different direction. Each of the three subsurfaces is geometrically shaped and positioned to direct light rays entering the optical element through that subsurface in such a way as to substantially collimate the light passing through the optical element.

The subsurfaces in FIG. 2 include spherical subsurface 120, and flat conical subsurface 123. Spherical subsurface 120 joins the bottom of the optical element in this view at the normal angle at corner 121. In this example embodiment, the spherical subsurface has a radius of curvature of approximately 3.66 mm. Corner 122 joins parabolic outer surface 108 and with corner 121 forms a flat, annular surface on the bottom of the optic. As will be seen in another example presented herein, the bottom portion of the optical element can be extended to accommodate various mounting situations. In this example embodiment, flat conical subsurface 123, has an angle of approximately 20 degrees relative to the normal.

Still referring to FIG. 2, the third subsurface forms a shallow cone that is inverted relative to flat conic subsurface 123, and is thus referred to as inverted conic subsurface 124. The angle of the inverted conic subsurface is approximately 70 degrees to the normal vector. In some embodiments, the inverted conic subsurface has a slight radius of curvature, for example, a radius of curvature of about 12 mm. Since the optic is clear, the edge of this shallow cone is visible as edge 126 in FIG. 2 and the point of the inverted cone is visible as point 127.

Figure 3A:
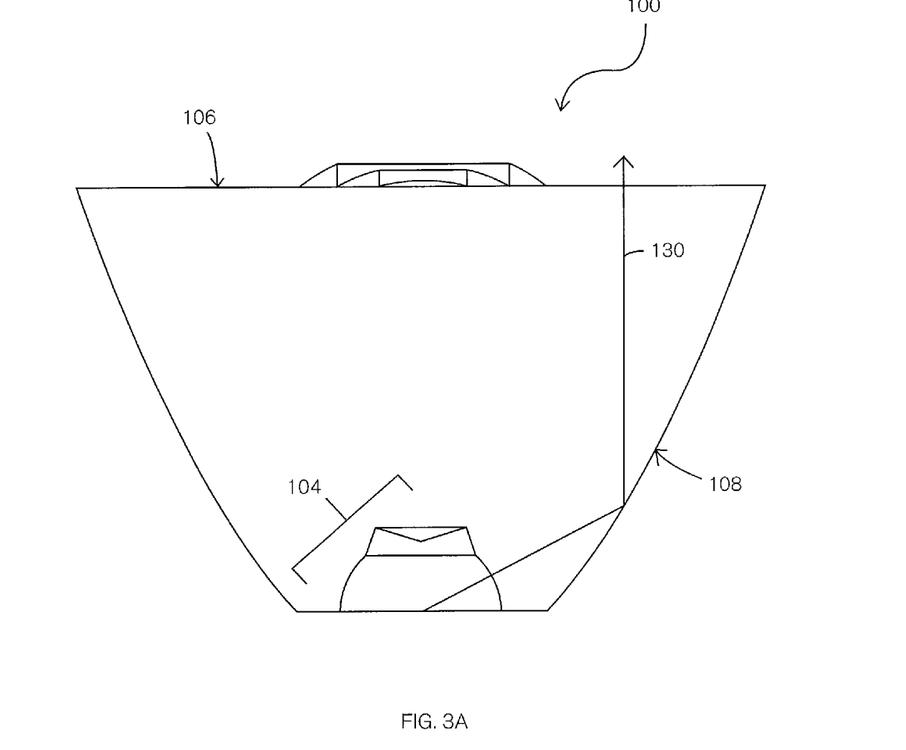
FIG. 3 shows three different, simplified views of the optical element of FIG. 1, in each case, showing the path of a light ray that enters the optical element through a different entry surface. The three views of FIG. 3 are illustrated in three sheets as FIG. 3A, FIG. 3B and FIG. 3C. In the cases of FIG. 3B and FIG. 3C, a dotted path is presented, which shows the path a light ray would take if it entered the optic from the same direction, but all light rays entered the optical element through a single, spherical entry surface.
Figure 3B:
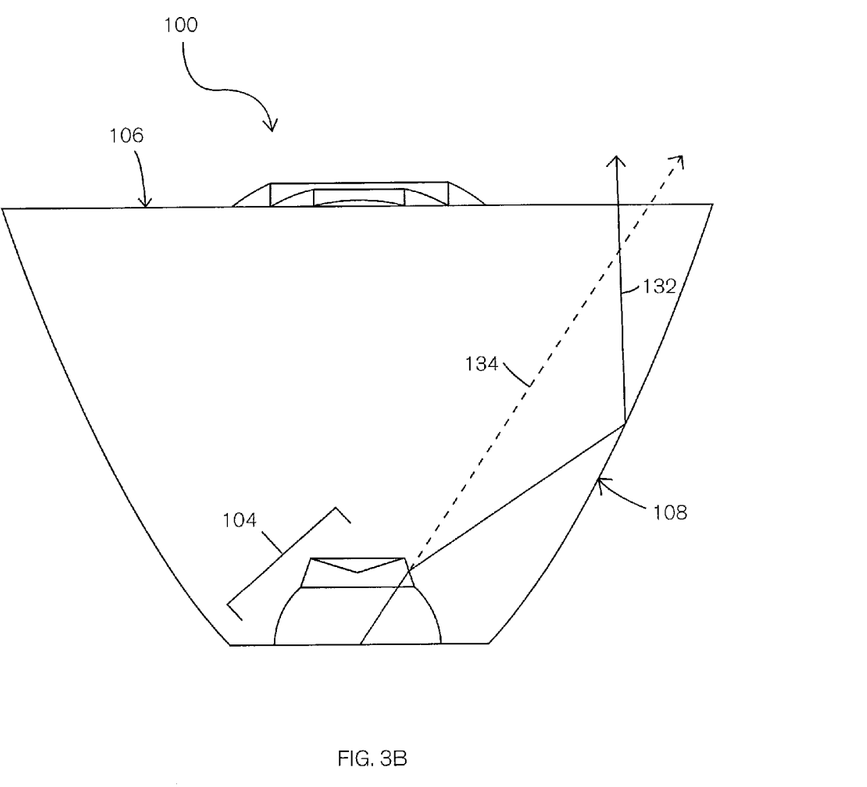
Figure 3C:
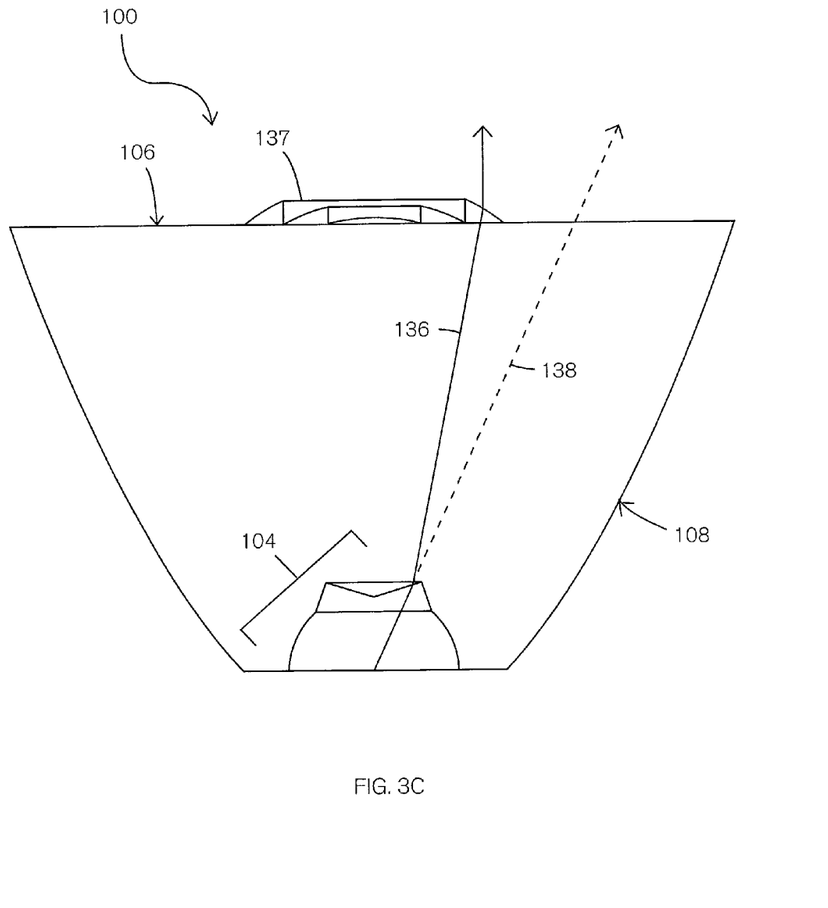

FIG. 3 illustrates the optical principle of operation of the optical element of an embodiment of the invention. FIG. 3 shows the operation of the optic using different tracings of light rays, presented one each in FIG. 3A, FIG. 3B and FIG. 3C. FIGS. 3A through 3C illustrate the interaction of the various subsurfaces of the entry surface 104. In general, the entry surface 104 divides the light from the light source into three categories based on how the light would pass through the optic if the entire entry surface was spherical. These categories are: 1) light which would strike the parabolic surface 108 and be redirected normal to the exit surface 106; 2) light which would pass directly through the exit surface 106 but or requires a relative small amount of redirection such that it may be effectively redirected to the parabolic outer surface 108; and 3) light which would pass directly through the exit surface 106 but require redirection to such a large extent that it may not be effectively redirected to the parabolic outer surface 108. Thus, the spherical portion of the entry surface 104 is sized to receive light that would pass through the spherical portion and strike the parabolic outer surface 108 and be reflected normal to the exit surface 106. The flat conic subsurface 123 of the entry surface 104 is sized and shaped to receive a portion of the light that, otherwise, would pass through the exit surface 106 without being redirected to be normal to the exit surface 106 redirect this portion of the light to the outer wall 108 for redirection normal to the exit surface 106. The inverted conic subsurface 124 of the entry surface 104 is sized and shaped to receive a portion of the light that, otherwise, would pass through the exit surface 106 without being redirected to be normal to the exit surface 106 but which is of such an angle that it may not be effective redirect by the flat conic portion 123 and redirects this portion of the light to the concentrator 110. The size of the concentrator 110 may depend on the shape and size of the inverted conic surface 124.

FIG. 3A shows what happens to a light ray 130, which enters optical element 100 through the spherical subsurface of the entry surface 104. Such a ray is not bent on entry since the ray goes through the entry surface of the optic at a normal angle. Such a light ray strikes the parabolic outer surface 108 at an angle to the normal that is greater than the critical angle and reflects internally to exit the optic at roughly a normal angle.

FIG. 3B illustrates what happens to a light ray entering optical element 100 from the light source when the light ray passes through the flat conic subsurface 123 of entry surface 104. Light ray 132 is bent towards the normal when it passes through the flat conic subsurface, and strikes parabolic outer surface 108 at an angle that is greater than the critical angle. Light ray 132 then reflects upwards and passes out of the optic at an angle relatively close to the normal vector, keeping the light collimated. Note that dotted light ray 134 illustrates the path a light ray would have taken if it had passed through an entirely spherical entry surface. Light ray 134 misses parabolic outer surface 108 and leaves the optic through exit surface 106 angled away from the center line of the optic. Because the light ray would have been bent away from the normal by passing from a medium with a high index of refraction to a medium with a low index of refraction, it would have left the optic at an even greater angle and been bent far away from the center line of the optical element, reducing collimation of the light.

FIG. 3C illustrates what happens to a light ray entering optical element 100 from the light source when the light ray passes through the inverted conic subsurface 124 of entry surface 104. Light ray 136 is bent towards the normal when it passes through the inverted conic subsurface, since it is passing from a medium with a lower index of refraction into a medium with a higher index of refraction. In this case, light ray 138 is bent enough to pass through the outer portion 137 of the Fresnel concentrator lens, and ends up leaving the optic almost parallel to the normal. Thus, the inverted conic portion of the entry subsurface also serves to collimate the light passing through the optical element. Note that dotted light ray 138 illustrates the path a light ray would have taken had the entry surface of the optic been completely spherical. In this case, the light ray misses parabolic outer surface 108 and the concentrator lens, and exits the optic through exit surface 106 angled away from the center line of the optic. Because such a light ray would have been bent away from the normal by passing from a medium with a high index of refraction to a medium with a low index of refraction, it would have left the optic at an even greater angle and been bent far away from the center line of the optical element, reducing collimation of the light.

The details of the entry surface of embodiments of the optic disclosed herein are but one example of how an optical element with an entry surface having three or more subsurfaces of different shapes or contours can be implemented. Various combinations of shapes and contours can be used for the subsurfaces of an entry surface of the optic. For example, curved, segmented, angled, spherical, conical, parabolic and/or arced surfaces can be used in various combinations. Subsurfaces of the entry surface as disclosed in the detailed examples herein can be used in a different arrangement. A subset of these subsurfaces (e.g. one or two) can be used in combination with a subsurface or subsurfaces of other shapes.

Figure 4:
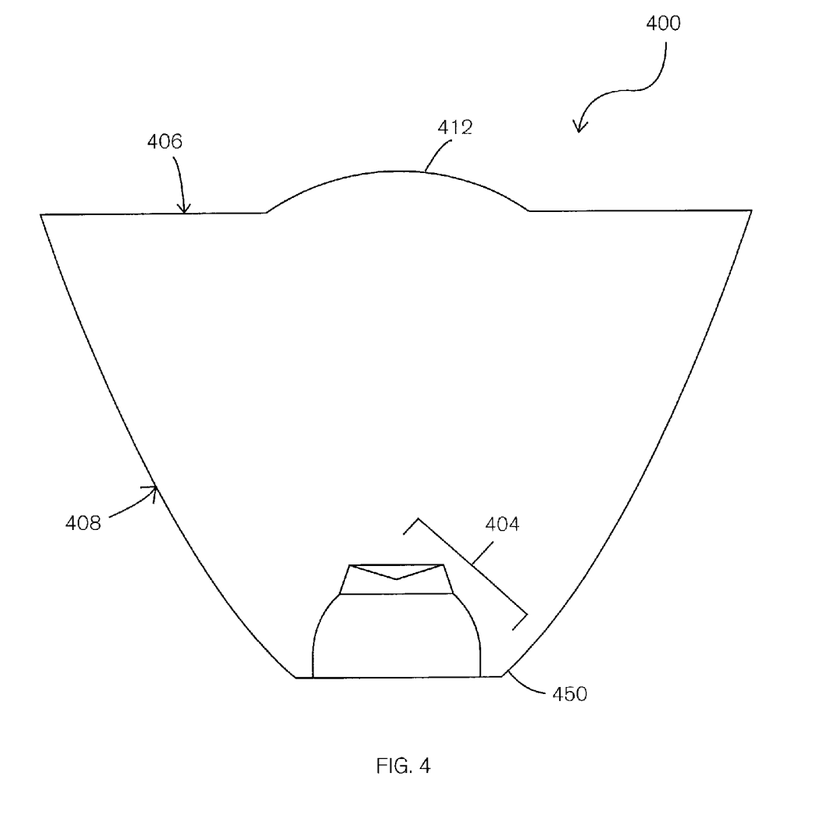
FIG. 4 shows a cross-sectional side view of an optical element according to further embodiments of the present invention.

FIG. 4 is another cross-sectional side view of an optical element according to example embodiments of the invention. In this case, the optical element has a spherical concentrator lens. Optic 400 includes entry surface 404. Light from the light source enters the optical element through one of the subsurfaces of the entry surface and exits the optical element through exit surface 406, which is positioned opposite entry surface 404. Optical element 400 includes parabolic outer surface 408, which is disposed roughly between and to the side of entry surface 404 and exit surface 406 as before. Again, the parabolic surface provides for many light rays, particularly those that enter the optic through the spherical subsurface of the entry surface to be totally reflected internally and exit the optic through exit, or top surface 406 at or near a normal angle relative to top surface 406. Optical element 400 has a spherical concentrator lens 412 disposed in or on exit surface 406. In at least some embodiments, the concentrator lens can be molded into the optic, for example where acrylic is used and the entire optic is injection molded. It should be noted that any concentrator lens is optional, since some lighting effects that may be desirable would not require a concentrator lens with some entry surfaces, and lenses of different types could also be used, including lenses that combine different types of surfaces. In the example shown in FIG. 4, the spherical concentrator lens has a diameter of approximately 11.2 mm and a radius of curvature of approximately 9 mm.

The embodiment of FIG. 4 shows another possible variation of the optical element. In the case of this embodiment, the outer surface is extend down further than in previous embodiments, to that the base of optic has a more protruding annular section 450, which may allow the optic to rest more directly on an LED mounting surface, depending on the particulars of the lighting system in which it is used.

It cannot be overemphasized that that there are almost infinite variations of embodiments of the optical element and lighting system of the present invention. Angles, sizes and placements of the subsurfaces that direct incoming light rays can be varied and additional subsurfaces can be included. Many variations of all of the surfaces of the optical element are possible. For example, the size and relationship of the various surfaces may depend on the size and light output characteristics of the light source, the desired beam angle, the amount of light mixing required and/or the materials used in the optic. Indeed, the entry surface of an optic according to embodiment of the invention can even be designed for various lighting effects, including effects in which the light is not collimated, but instead formed to project decorative or utilitarian patterns of various kinds. Such variations can be used with outer surfaces of various shapes, and with or without concentrator lenses. Variations can be designed using photometric simulation software tools that provide ray tracings and/or isolux curves. Such tools are publicly available from various sources. One example of such a computer software simulation tool is Photopia, published by LTI Optics, LLC, of Westminster, Colo., USA.

Figure 5:
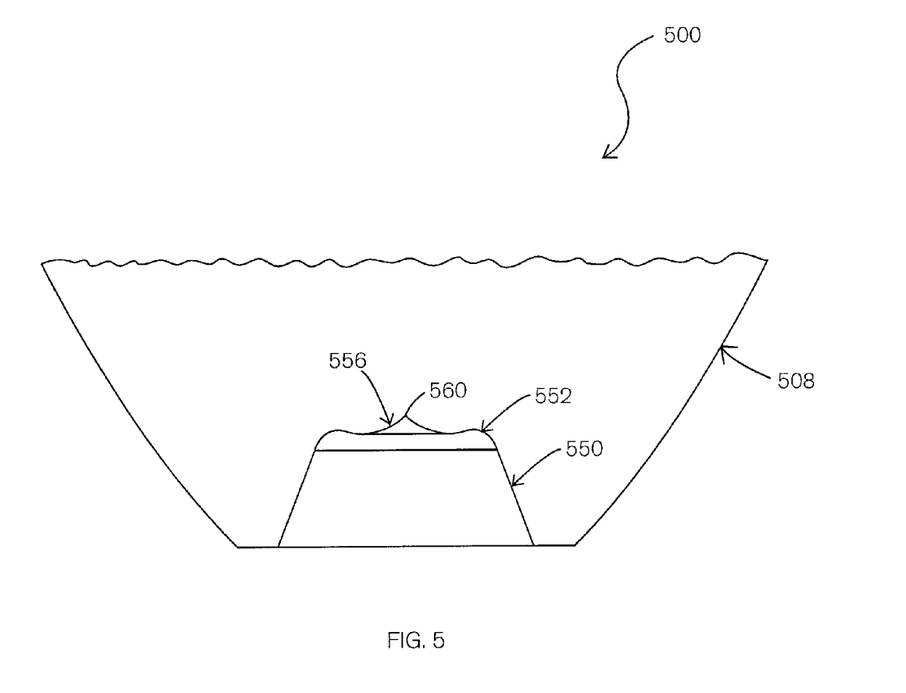
FIG. 5 shows a magnified, cross-sectional side view of the entry surface portion of an optical element according to further embodiments of the present invention.

FIG. 5 illustrates another variation of the entry surface for embodiments of the optic. FIG. 5 shows a cutaway, magnified, cross-sectional view of the entry surface of an optic, 500, having outer surface 508. In the example of FIG. 5, the entry surface includes flat subsurface 550, spherical subsurface 552 and inverted spherical subsurface 556. In this example, flat subsurface 550 is angled to the normal vector at an angle of approximately 20 degrees. Spherical subsurface 552 has a smaller radius of curvature than inverted spherical subsurface 556. Also, inverted spherical subsurface 556 extends upward around the normal vector through the center of the optic so that it forms point 560.

Figure 6:
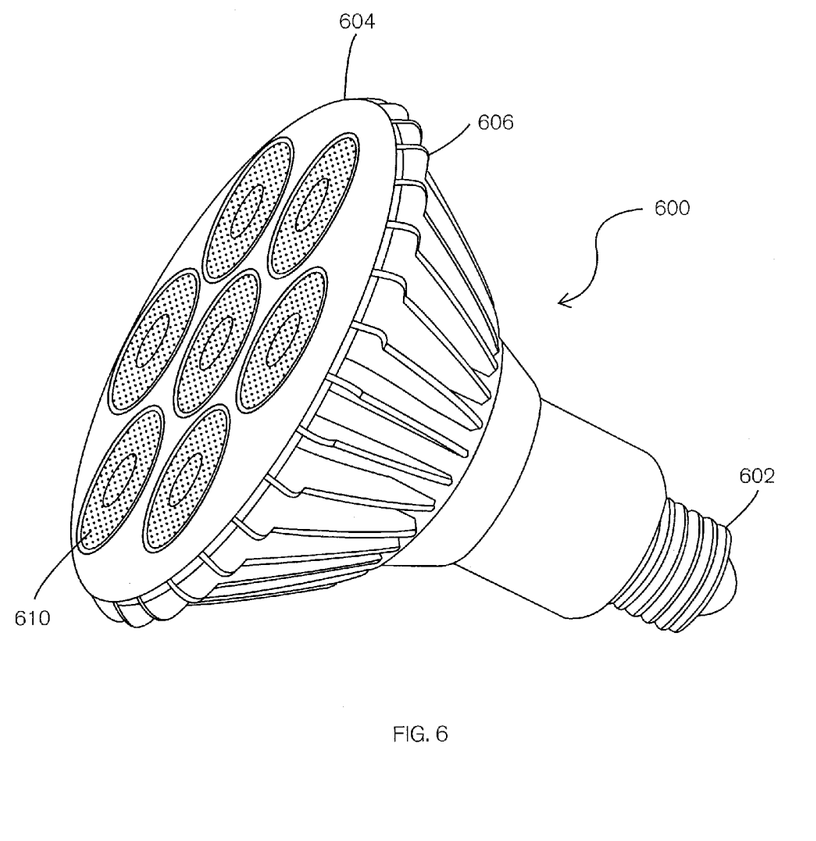
FIG. 6 illustrates a light system according to example embodiments of the invention, specifically, an LED replacement light bulb that makes use of an array of light sources and a corresponding array of optical elements according to example embodiments of the present invention.

FIG. 6 is an illustration of a lighting system making use of an optical element as described herein. Lighting system 600 is formed to be a replacement for a standard R30 incandescent bulb of the type commonly used in so-called "recessed can" ceiling light fixtures. The lighting system includes a standard threaded base 602. Seven LED modules are used as the light source and are located inside the lighting system behind front plate 604. Cooling fins 606 aid in maintaining an appropriate operating temperature inside the system. There is a void above each LED module, and the void contains optical element 610, which is an optical element according to example embodiments of the present invention.

The top surface of each optical element in FIG. 6 includes a color mixing treatment, visible in FIG. 6 as dots or stipples on the top surface of the optic that serve as a diffractive surface treatment on the exit surface. An alternative color mixing treatment would be to provide caps made of volumetric diffusion material spaced a small airgap way from the exit surface. This cap would be fitted over each optical element, and would not significantly alter the appearance of the system of FIG. 6, since in order to maintain the airgap; each cap could have a bump-out over the concentrator lens. Other possible color mixing treatments include a patterned lens treatment, which again, if applied to the exit surface would not alter the appearance of the system of FIG. 6 significantly. Faceting on the entry surface or the parabolic surface of the optical element could also be used as a color mixing treatment, in which case, the dots or stippling on top of each optic in FIG. 6 might not be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "less" and "greater", are intended to encompass the concept of equality, thus, "less" can mean not only "less" in the strictest mathematical sense, but also, "less than or equal to."

It should also be pointed out that references may be made throughout this disclosure to figures and descriptions using terms such as "top", "bottom", "side", "in", "within", "on", and other terms which imply a relative position of a structure, portion or view. These terms are used merely for convenience and refer only to the relative position of features as shown from the perspective of the reader. An element that is placed or disposed atop another element in the context of this disclosure can be functionally in the same place in an actual product but be beside or below the other element relative to an observer due to the orientation of a device or equipment. Any discussions which use these terms are meant to encompass various possibilities for orientation and placement.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. An optical element for a lighting system, the optical element comprising:
    a flat, annular bottom surface;
    an entry surface comprising at least three subsurfaces including an inverted conic subsurface and a spherical subsurface that joins the flat, annular bottom surface at a normal angle at a first corner, wherein each subsurface is disposed to receive light rays from a light source in a different direction;
    an exit surface opposite the entry surface;
    a Fresnel concentrator lens disposed in or on the exit surface to receive the light rays from the inverted conic subsurface near the center of the exit surface and direct the light rays towards the normal; and
    an outer surface disposed between the exit surface and the flat, annular bottom surface that joins the flat annular bottom surface at a second corner;
    wherein each of the three subsurfaces is shaped and positioned to direct light rays through the optical element so that many light rays exit the optic at a normal angle relative to the exit surface.

2. The optical element of claim 1 wherein the at least three subsurfaces further comprise a flat conic subsurface.

3. The optical element of claim 2 wherein the outer surface is a conic surface.

4. The optical element of claim 3 wherein the outer surface is a parabolic surface that provides for all incident light rays received through the entry surface to be totally internally reflected.

5. The optical element of claim 4 further comprising a mixing treatment.

6. The optical element of claim 5 wherein the mixing treatment comprises a diffractive surface treatment in the exit surface.

7. The optical element of claim 5 wherein the mixing treatment comprises a patterned lens treatment in the exit surface.

8. The optical element of claim 5 wherein the mixing treatment comprises faceting in one of the entry surface and the outer surface.

9. The optical element of claim 1, wherein the exit surface further comprises a concentrator lens and wherein:
- a first of the three subsurfaces directs a first portion of light from the light source to the outer surface; and
- a second of the three subsurfaces directs a second portion of light from the light source to the outer surface.

10. A lighting system comprising:
a light source; and
an optical element further comprising,
- a flat, annular bottom surface;
- an entry surface near the light source, the entry surface comprising at least three subsurfaces including an inverted conic subsurface and a spherical subsurface that joins the flat, annular bottom surface at a normal angle at a first corner, wherein each subsurface is disposed to receive light rays leaving the light source in a different direction;
- an exit surface opposite the entry surface;
- a Fresnel concentrator lens disposed in or on the exit surface to receive the light rays from the inverted conic subsurface near the center of the exit surface and direct the light rays towards the normal; and
- an outer surface disposed between the exit surface and the flat, annular bottom surface that joins the flat annular bottom surface at a second corner;
- wherein each of the three subsurfaces is shaped and positioned to direct light rays through the lighting system so that many light rays exit the optic at a normal angle relative to the exit surface.

11. The lighting system of claim 10 wherein the at least three subsurfaces further comprise a flat conic subsurface.

12. The lighting system of claim 11 wherein the outer surface is a conic surface.

13. The lighting system of claim 12 wherein the outer surface is a parabolic surface that provides for all incident light rays received through the entry surface to be totally internally reflected.

14. The lighting system of claim 13 wherein the light source is a light emitting diode (LED).

15. The lighting system of claim 14 wherein:
the light source comprises a plurality of LED packages arranged in an array; and
the optical element comprises a plurality of optical elements, each with the entry surface near one of the plurality of the LEDs.

16. The lighting system of claim 14 further comprising a mixing treatment.

17. The lighting system of claim 16 wherein the mixing treatment comprises a diffractive surface treatment in the exit surface.

18. The lighting system of claim 16 wherein the mixing treatment comprises a patterned lens treatment in the exit surface.

19. The lighting system of claim 16 wherein the mixing treatment comprises faceting in one of the entry surface and the outer surface.

20. The lighting system of claim 10, wherein the exit surface further comprises a concentrator lens and wherein:
- a first of the three subsurfaces directs a first portion of light from the light source to the outer surface;
- a second of the three subsurfaces directs a second portion of light from the light source to the outer surface.

21. A method of assembling a lighting system, the method comprising:
arranging a plurality of light sources in a pattern; and
placing an optical element at each light source to receive light rays through an entry surface of the optical element comprising at least three subsurfaces including an inverted conic subsurface and a spherical subsurface that joins a flat, annular bottom surface of the optical element at a normal angle at a first corner, wherein each subsurface is disposed to receive light rays leaving the light source in a different direction, and wherein each optical element further comprises,
- an exit surface opposite the entry surface;
- a Fresnel concentrator lens disposed in or on the exit surface to receive the light rays from the inverted conic subsurface near the center of the exit surface and direct the light rays towards the normal; and
- an outer surface disposed between the exit surface and the flat, annular bottom surface that joins the flat annular bottom surface at a second corner, so that the three subsurfaces direct light rays entering the optical element through the lighting system to cause many light rays to exit the optic at a normal angle relative to the exit surface.

22. The method of claim 21 wherein each light source is a light emitting diode (LED).

23. The method of claim 22 wherein each optical element further comprises a diffractive surface treatment in the exit surface.

24. The method of claim 22 wherein each optical element further comprises a patterned lens treatment in the exit surface.

25. The method of claim 22 wherein each optical element further comprises faceting in one of the entry surface and the outer surface.

* * * * *